United States Patent [19]
Sumi et al.

[11] 3,941,967
[45] Mar. 2, 1976

[54] MICROWAVE COOKING APPARATUS

[75] Inventors: Momoki Sumi, Tokyo; Goro Kanda, Sagamihara; Norio Iriguchi; Susumu Isohata, both of Fuji; Kyoichi Sasaki, Seijyo, all of Japan

[73] Assignee: Asahi Kasei Kogyo Kabushiki Kaisha, Osaka, Japan

[22] Filed: Sept. 28, 1973

[21] Appl. No.: 401,719

[52] U.S. Cl. .................................... 219/10.55 E
[51] Int. Cl.[2] ................................. H05B 9/06
[58] Field of Search ............... 219/10.55, 10.55 E; 99/430

[56] References Cited
UNITED STATES PATENTS

| | | |
|---|---|---|
| 2,714,070 | 7/1955 | Welch .................. 219/10.55 E |
| 2,830,162 | 4/1958 | Copson et al. ............ 219/10.55 |
| 3,547,661 | 12/1970 | Stevenson ............... 219/10.55 |
| 3,662,141 | 5/1972 | Schaweb ............... 219/10.55 E |
| 3,731,037 | 5/1973 | Levinson ............... 219/10.55 |
| 3,773,669 | 11/1973 | Yamauchi et al. ......... 219/10.55 E |
| 3,777,099 | 12/1973 | Levinson ............... 219/10.55 E |
| 3,783,220 | 1/1974 | Tanizaki ............... 219/10.55 |
| 3,835,281 | 9/1974 | Manniy ............... 219/10.55 E |
| 3,845,266 | 10/1974 | Derby ............... 219/10.55 E |
| 3,854,021 | 12/1974 | Moore et al. ............ 219/10.55 E |
| 3,854,023 | 12/1974 | Levinson ............... 219/10.55 E |

FOREIGN PATENTS OR APPLICATIONS 1,049,019 1/1959 Germany .................. 219/10.55

*Primary Examiner*—Bruce A. Reynolds
*Attorney, Agent, or Firm*—Cooper, Dunham, Clark, Griffin & Moran

[57] ABSTRACT

A microwave oven comprises a heating element which produces heat by absorption of microwave radiation and on which is placed a material to be cooked with the interposition of a material support therebetween. If required, the heating element is disposed on a heat insulating body. A shield cover is arranged on the support for enclosing the material to be cooked placed on the support and for limiting the amount of microwave radiation which is allowed to be incident on the material from the exterior thereof. The material to be cooked is internally heated upon irradiation with the radiation and at the same time the heating element produces heat which is applied to the surface of the material through the material support. When the material support comprises a metal plate, an electric insulating body which prevents a spark discharge is arranged between the shield cover and the metal plate.

3 Claims, 9 Drawing Figures

U.S. Patent   March 2, 1976   3,941,967
FIG_1
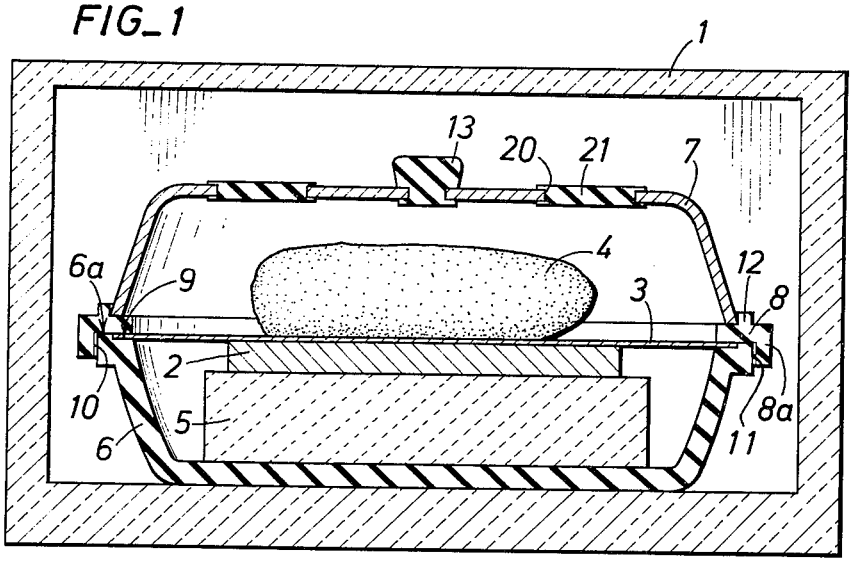
FIG_2
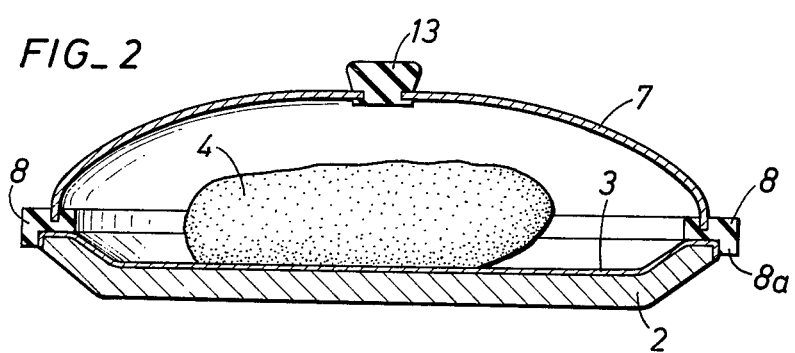
FIG_3
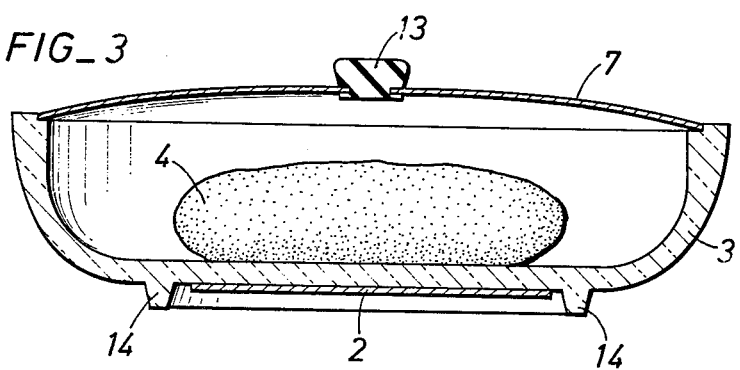

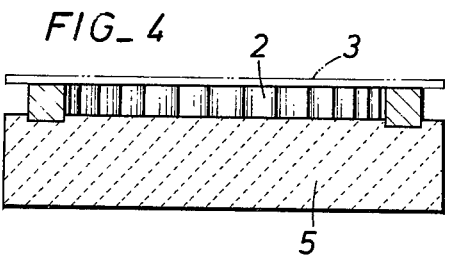
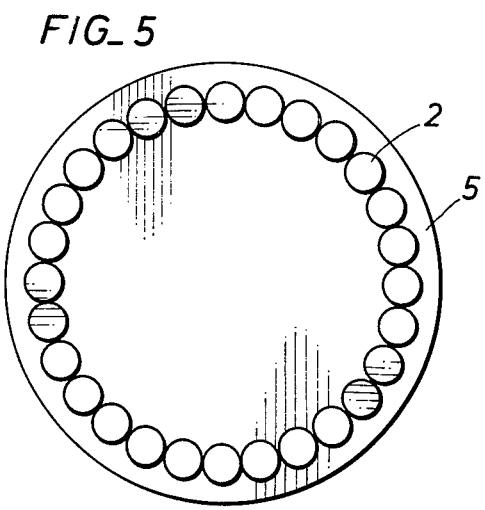
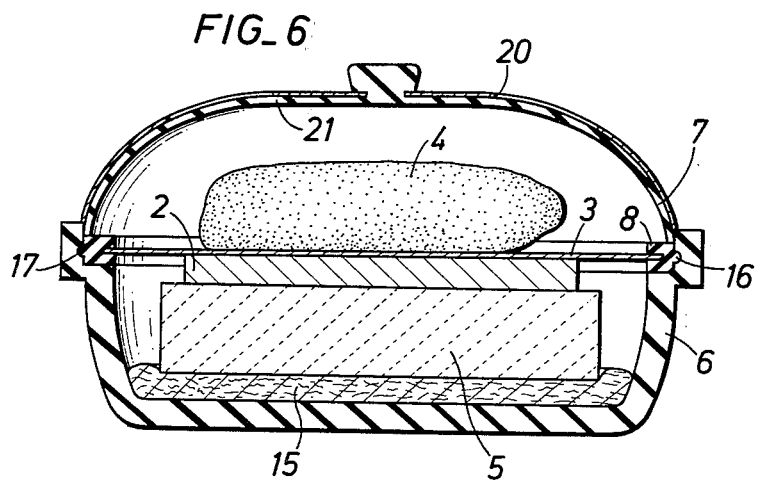

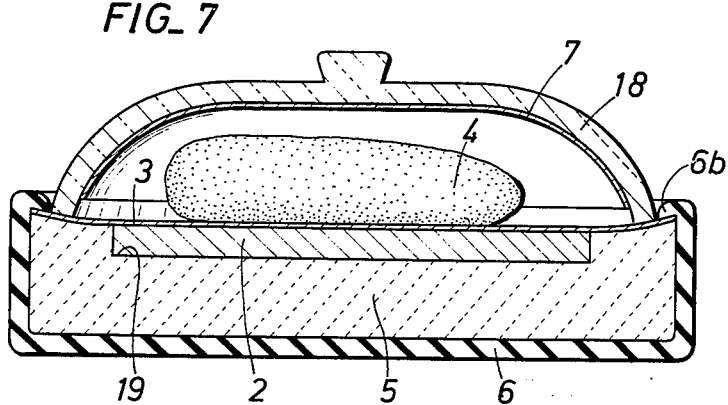
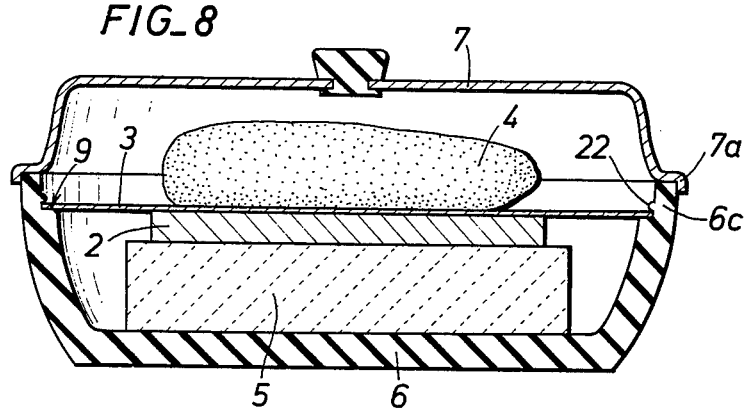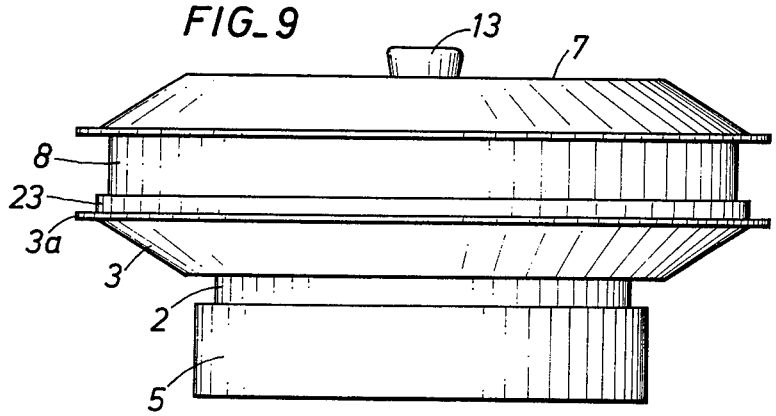

MICROWAVE COOKING APPARATUS

BACKGROUND OF THE INVENTION

The invention relates to a cooking apparatus in which the cooking is effected by irradiating a material to be cooked with microwave radiation, and more particularly to a microwave cooking apparatus in which a scorched texture is effectively produced on the material to be cooked.

Generally, when cooking with a microwave oven, no scorching appears on the surface of a material to be cooked in view of the nature of heating which takes place only internally of the material. However, the scorching is often necessary to suit the taste because the absence of scorching when roasting or broiling a fish results in an appearance that the fish remains raw or undone and such absence of gratin diminishes its taste. These considerations led to the use of scorching means concurrently with the cooking of a material in a microwave oven, which means heretofore comprised (1) incorporating an infrared or nichrome wire heater within the microwave oven, (2) using a dish comprising ferrite or silicon carbide ceramics as a microwave absorbing, heating element, (3) flame spraying a resistive film to the rear surface of a heat-resisting glass with supporting metal legs attached thereto, (4) placing a material to be cooked on a microwave absorbing heating element which is provided with metal antennas, (5) placing a material to be cooked which is enclosed by an aluminium foil on the heating element, or the like.

However, these techniques involve various drawbacks which are mentioned below. Specifically, the technique (1) must upgrade the power capacity of the microwave oven to effect the heating by microwave radiation concurrently with the scorching by the heater or must tolerate the heating by the microwave radiation followed by the scorching with the heater. However, the general house wiring from the distribution line may not accommodate for the required power in the former case, which must be supplemented by an additional wiring work to the kitchen, dining room or other location of the customary household where the microwave oven is located. In the latter case, the labor and time required for the cooking are doubled. In addition, the scorching cannot be achieved with a microwave oven which is not provided with a heater. Furthermore, the cool cooking which characterises the usual microwave oven is no longer possible, thus rendering the use of paper napkin, plastic receptacle or the like impossible. The entire interior of the oven is substantially heated, so that the interior structure of the oven must be made of refractory material. Furthermore, there is the possibility for oil from the material to be cooked such as meat or fish to be sputtered around. The technique (2) utilizes the fact that a dish formed of ferrite or silicon carbide ceramic produces a great deal of heat when subjected to microwave radiation, but has a general tendency to absorb the moisture, or to retard the generation of heat due to its absorption of microwave radiation when it is co-existent with a material to be cooked, as compared with when such material is left alone, thereby requiring a considerably increased length of time until a temperature is reached at which a scorching appears on the surface of a material to be cooked. If such an increased period of time is allowed for the purpose of scorching, there arises the likelihood that the material to be cooked is excessively internally heated or becomes dried up. To avoid these likelihoods, it is necessary to pre-heat the heating element alone before a material to be cooked is placed in contact therewith for the purpose of microwave heating, which however renders the cooking procedure complicate. In addition, there is also the possibility that a detergent or oil contained in a material to be cooked may become absorbed into the heating element, or conversely harmful metals within the heating element may become mixed with the material to be cooked. The technique (3) involves the disadvantages that the resistive film is susceptible to mechanical detachment, that the supporting metal legs may cause a hazardous spark discharge upon contact with the inner surface of the oven to thereby damage it, and that it often requires a pre-heating without the material as in the technique (2). The fourth technique is also susceptible to the occurrence of a hazardous spark discharge upon contact of the antenna with the inside of the oven to damage it, and also often requires a pre-heating of the heating element alone. Finally, the fifth technique, while it permits a certain degree of control over the heating and/or the suppression of drying up without recourse to pre-heating by virtue of the partial shielding effect of the microwave radiation provided by the aluminium foil, suffers from poor reproducibility, and does not assure the re-use of the aluminium foil. In addition, the aluminium foil may cause a spark discharge within the oven.

Therefore, it is an object of the invention to provide a microwave cooking apparatus capable of scorching a material to be cooked and which is hygienic and safe in operation.

It is another object of the invention to provide a microwave cooking apparatus capable of scorching the surface of a material to be cooked without excessively heating the interior of the material.

It is a further object of the invention to provide a microwave cooking apparatus which permits the scorching of the surface of a material to be cooked with minimized labor and without requiring a pre-heating of the heating element alone.

It is an additional object of the invention to provide a microwave cooking apparatus which can be used in the general household without requiring a special house wiring.

It is still another object of the invention to provide a microwave cooking apparatus capable of scorching the surface of a material to be cooked and which is safe and insusceptible to a spark charge and damage.

It is a still further object of the invention to provide a microwave cooking apparatus which enables the control over both the internal heating of a material to be cooked and the degree of scorching of the surface thereof.

SUMMARY OF THE INVENTION

In accordance with the invention, there is provided a microwave cooking apparatus comprising a vessel subjected to irradiation with microwave radiation, the vessel housing a heating element which produces heat by absorption of the microwave radiation, a support placed thereon for carrying a material to be cooked, and a shield cover located on the support to enclose the material to be cooked and to isolate the microwave radiation therefrom. When the support for the material to be cooked comprises a metal plate, an insulating material is interposed between the shield cover and the metal plate to prevent them from contacting with each other. If required, the heating element is placed on an electrically insulating and heat insulating body, and both the heating element and the insulating body may be contained within an insulating vessel which permits transmission of the microwave radiation, as required.

In the above arrangement, when the irradiation with the microwave is turned on, the material to be cooked is internally heated by the microwave which is transmitted through the shield cover itself and/or the support for the material to be cooked or through the space between them. The heating element is heated to a high temperature as a result of the application of the microwave radiation thereto, which heat serves to heat the material through the support, thereby providing a scorched texture on the surface of the material.

Because the material to be cooked is placed in contact with the heating element through the interposition of the support for the material, the arrangement is hygienic without causing a reduction in the efficiency of the heating element. When the internal heating is found to be excessive, it can be suppressed by the use of the shield cover, thereby enabling the internal heating of the material to be cooked to be set to a suitable level by properly adjusting the leakage of the microwave radiation through the shield cover. By using a shield cover which is an air tight structure, the evolution of the moisture from the material to be cooked can be prevented. When the insulating body is used, the loss of heat from the heating element is minimized and the occurrence of a spark discharge as a result of contact between the heating element and the inner wall of the oven can be prevented. The handling can be greatly facilitated by containing the heating element and the heat insulating body within an insulated vessel.

Means for adjusting the amount of the microwave radiation which transmits through the shield cover in accordance with the variety of the material to be cooked is provided, as by adjusting the spacing between the shield cover and the support, by changing the height of the insulating body or by varying the dimension of the microwave transmitting aperture or apertures formed in the shield cover. The handling is greatly facilitated when the support for the material to be cooked, the heating element and, if required, the heat insulating body are contained in an insulated vessel in a manner to form a unitary construction.

In another embodiment of the invention, a material to be cooked is placed on top of a dish formed of a ferrite ceramic with a metal plate interposed therebetween as a support, and is enclosed by a shield cover. In a further embodiment of the invention, a resistive film is applied, as a heating element, to the rear surface of a dish formed of heat-resisting glass, the dish serving as a support on which a material to be cooked is placed with the material being enclosed by the shield cover.

BRIEF DESCRIPTION OF DRAWINGS

FIGS. 1 to 3 are schematic cross sections showing one embodiment of the microwave cooking apparatus according to the invention;

FIG. 4 is a cross section of one example of the heating element;

FIG. 5 is a plan view of FIG. 4;

FIGS. 6 to 8 are schematic cross sections showing another embodiment of the microwave cooking apparatus according to the invention; and FIG. 9 is a front view showing the principal parts of a further embodiment of the apparatus according to the invention.

DETAILED DESCRIPTION OF THE PREFERRED EMBODIMENT

Referring to FIG. 1, there is shown a microwave oven according to the invention including a casing 1 in which is disposed a heating element 2 adapted to produce heat by absorption of microwave radiation. On top of the heating element 2 is arranged a metal plate 3 which serves as the support for a material 4 to be cooked placed thereon. The heating element 2 is retained on a heat insulating body 5, with the heat insulating body 5, the heating element 2 and the metal plate 3 being contained within an insulating vessel 6. In the present example, the open top of the vessel 6 is closed by the metal plate 3. A shield cover 7 which encloses the material 4 to be cooked and isolates the microwave radiation is arranged on top of the metal plate 3, and has its periphery located on the metal plate 3 with an insulating body 8 interposed therebetween. The periphery of the metal plate 3 is attached to the insulating vessel 6 for the convenience of handling. At this end, the inner periphery of the top 6a of the insulating vessel 6 is formed with an annular step 9 against which the periphery of the metal plate 3 abuts. The insulating body 8 is in the form of a ring having an integral annular extension 8a which extends downwardly to a small distance and which is internally formed with a thread 10 which is in turn threadably engaged by a thread 11 formed on the outer periphery of the top of the vessel 6, whereby the insulating body 8 is mechanically unified with a vessel 6 while holding the periphery of the metal plate 3 against the step 9. As a result of such construction, the heating element 2 and the heat insulating body 5 are pressed down by the metal plate 3 against the bottom of the vessel 6 to be retained in place mechanically. The upper surface of the insulating body 8 is formed with an integral annular rib 12 which abuts against the outer periphery of the shield cover 7 to prevent its displacement. A knob 13 of an insulating material is attached to the central area of the shield cover 7.

When the insulating vessel 6 and the insulating body 8 are formed of glass, porcelain or ceramic, or synthetic resin such as fluorine-contained resin, polypropylene, polyethylene, polystyrene, polyester or the like which permits the transmission of microwave radiation without substantial loss, their machining is facilitated and a high resistance to mechanical shocks is provided. Of these synthetic resins, fluorine-contained resin is most preferred in view of its heat resistance, but because of the expensiveness involved with this material, polypropylene which is relatively inexpensive and provides an acceptable degree of heat resistance may be preferred for practical purposes.

Another embodiment of the invention is shown in FIG. 2 in which the heating element comprises a dish 2 of ferrite ceramic, the inner periphery of which is overlaid with a metal plate 3. The outer periphery of the metal plate 3 is partially folded over the outer periphery of the dish 2 to provide a mechanical connection between the metal plate 3 and the dish 2. A shield cover 7 has its periphery embedded into an insulating body 8 for the purpose of providing a unitary construction, and is positioned relative to the dish 2 by an annular extension 8a of the insulating body 8.

In FIG. 3, a support 3 for a material to be cooked comprises a dish of heat-resisting glass, to the bottom surface of which is applied a resistive film as a heating element 2. To avoid the possibility that the dish 3 is located so as to bring the resistive film 2 into contact with an external body directly, the bottom surface of the dish 3 is integrally formed with suitable projections 14. In this instance, the support 3 for the material to be cooked is formed of an insulating material, so that the insulating body 8 mentioned above is omitted and the periphery of the shield cover 7 is disposed in direct contact with the support 3.

For use as a heating element 2 which produces heat by absorption of microwave radiation, a ferrite ceramic, silicon carbide ceramic or a resistive film may be used as is known. By way of example, an effective heating element may be provided by an agglomeration comprising semiconductor particles measuring 1 to 40mm in length and having a specific resistance of $10^{-4}$ to $10^8 \Omega$-cm, assembled together. Alternatively, when particles formed of barium ferrite or strontium ferrite added with 1 to 10% by weight of silicon dioxide or titanium dioxide and fired at a temperature between 1200° to 1400°C are assembled together so as to maintain contact with each other, there is provided a microwave absorbing, heating element which functions with a high performance. In this instance, silicon oxide or titanium dioxide serves to reduce the specific resistance of the ferrite, and the d.c. specific resistance will be on the order of $10^0$ to $10^5$ $\Omega$-cm at room temperatures. Specific examples are shown in FIGS. 4 and 5 in which the semiconductor particles are shaped into a solid cylinder, the end face of which is disposed for abutment against the support 3 for the material to be cooked in order to improve the thermal contact therebetween. In the example shown, the particles are arranged in the form of an annulus while maintaining contact between adjacent particles, and if required, a plurality of such annular arrays may be provided in concentric relationship. Such a disposition provides substantially uniform heating, preventing localized heating around the annular array.

The support 3 for a material to be cooked comprises a metal, heat-resisting glass or porcelain or ceramic which has a sufficient heat resistance and is not harmful to human beings. In particular, 18 chrome steel having a thickness on the order of 0.3 to 0.5mm is preferred. An excessively thin support 3 will be fragile, while an excessively high thickness is not desirable because of the increased heat conduction loss. A metal plate having a thickness on the order of 0.2 to 1.0mm, more preferably 0.3 to 0.6mm is preferred, and when glass or ceramic is used alternatively, a thickness on the order of 1 to 10mm is used. The heat insulating body 5 may comprise, for example, a refractory and heat isolating brick of alumina, silica, magnesia or the like. In such an instance, it is also possible to provide a layer of mineral fibre 15 having a high refractory resistance under the alumina brick, as shown in FIG. 6, so as to provide a cushioning effect additionally. In the arrangement of FIG. 6, the periphery of a metal plate 3 is embedded into the inner periphery of an annular insulating body 8 for the purpose of unification, while the outer periphery of the insulating body 8 is integrally formed with a rib 16 which is fitted into an annular groove 17 formed in the inner periphery of the insulating vessel 6 for the purpose of providing a connection therebetween.

A shield cover 7 may comprise a metal plate or metal meshwork. Where a metal meshwork is used, the mesh size should be less than half the wavelength of the microwave used. A metal meshwork provides the convenience that a material 4 to be cooked can be viewed from the exterior through the shield cover, while it is subject to the evaporation of the moisture. In order to provide a shield cover 7 which permits the material 4 to be cooked to be viewed from the exterior and prevents the evaporation of the mositure, a transparent glass having a transparent and electrically conductive layer may be used. FIG. 7 shows such an example in which the shield cover 7 comprising a transparent and electrically conductive layer is formed on the inner surface or the outer surface of a glass body 18 which is in the form of an inverted cup. The shield cover 7 or transparent and conductive layer is not formed around the lower periphery of the glass body 18 to leave this region as an insulating body 8, thereby permitting the shield cover 7 and the insulating body 8 to be unified. In this instance, an insulating vessel 6 formed of polypropylene is filled with a heat insulating body 5 of foamed alumina, with the heat insulating body 5 being formed with a shallow recess 19 in it upper surface in which a heating element 2 is fitted. A metal plate 3 is placed on top of the heating element 2, with the periphery of the plate 3 being held in place by the in-turned periphery 6b of the insulating vessel 6.

When the shield cover 7 comprises a metal plate or fine-meshed metal meshwork, an aperture or apertures 20 for partial transmission of the microwave radiation are formed therein as shown in FIG. 1, the amount of the microwave radiation contributing to the internal heating of the material 4 to be cooked being adjusted by the number or size of the apertures provided. Such adjustment of the amount of the microwave radiation permitted to transmit therethrough may be achieved by changing the mesh size where the shield cover 7 comprises a metal meshwork. The apertures in the cover 7 or the meshes in the metal meshwork 7 may be blocked by an insulating material 21 such as glass, porcelain, ceramic, synthetic resin or the like which involves no loss of the microwave radiation, thereby suppressing the evaporation of water from the material 4 to be cooked. Such insulating material 21 may be applied as an insulating layer covering the entire surface of the shield cover 7 as shown in FIG. 6. This insulating layer may be substituted for the glass body 18 of FIG. 7, for example. Alternatively, the shield cover 7 may be embedded in such insulating layer. Suitable materials for the insulating layer include plastics such as fluorine-contained resin, polypropylene, polyethylene, polystyrene, polyester or the like, in view of their machinability, substantially loss-free characteristics at microwave frequencies, and high resistance to mechanical shocks. From the aspect of heat resistance, fluorine-contained resin is most preferred, but polypropylene may be used for economical reasons, though its heat resistance is slightly inferior to that of fluorine-contained resin. The amount of microwave radiation which contributes to the internal heating of the material 4 to be cooked may also be adjusted by changing the height of an insulating body 8 which is interposed between the metal plate 3 and the cover 7, as shown in FIG. 9. Thus, a plurality of insulating bodies 8 in the form of hollow cylinders or parallelpipeds of short but different axial lengths may be provided and selectively used to vary the spacing between the metal plate 3 and the shield cover 7, thereby adjusting the amount of microwave radiation which transmits through the spacing to thereby control such amount contributing to the internal heating of the material 4 to be cooked. As shown in FIG. 8, a metal plate 3 is held against an inner step 9 of the top of an insulating vessel 6, which is extended upwardly to provide an extension 6c which serves as an insulating body 8. The periphery 7a of a shield cover 7 is extended in the form of a flange which is positioned on the extension 6c of the vessel 6. The metal plate 3 is held in place by the vessel 6 as a result of its engagement with projections 22 formed on the inner surface of the top of the vessel 6.

EXAMPLE 1

An apparatus has been constructed as shown in FIG. 9 using a heat insulating body 5 comprising heat insulating brick, on which was placed a 150g mass of heating element 2 which comprises manganese zinc ferrite ceramic plate. On top of the heating element 2 is placed a dish-shaped metal plate 3 formed of stainless steel and measuring 200mm in diameter and 0.4mm in thickness, the open top of the metal plate 3 being shaped into a flange 3a which extends in a direction perpendicular to the axis. A cylindrical insulating body 8 formed of polypropylene and having a short axial length is disposed on the flange 3a, and is enclosed by a shield cover 7 formed of stainless steel plate. A plurality of insulating bodies 8 are prepared having different heights so as to be interchangeable. To facilitate the positioning of the insulating plate with respect to the metal plate 3, a rib 23 is formed on the upper surface of the flange 3a so as to extend around the outer or inner periphery of the insulating body 8.

When microwave radiation is applied to this cooking apparatus, the microwave radiation penetrates into the interior of the apparatus transmitting through that portion of the insulating body 8 which is located between the dish-shaped metal plate 3 and the cover 7 in the form of a metal plate, and provides a microwave heating of a material to be cooked (not shown) placed on the metal plate 3. Additionally, the microwave radiation is also absorbed by the heating body 2 which therefore is heated to high temperatures, and the heat therefrom is transmitted through the metal plate 3 to heat the surface of the material to be cooked which is placed in contact therewith. Cooking experiments have been conducted when insulating bodies 8 having heights of 0.5cm and 2.0cm are used and when the metal plate cover 7 is removed. The material to be cooked comprises 50g of commercially available hotcake mix powder added with 40g of water, which was placed on the metal plate 3, and a microwave signal having a frequency of 2450 MHz and output of 650W was applied for a time period of 2.5 minutes.

When an insulating body 8 having a height of 0.5cm is used, the material to be cooked has been scorched on its surface contacting the metal plate 3, but the internal heating is insufficient. When an insulating body 8 having a height of 2.0cm is used, the material is sufficiently heated throughout its interior and exhibited scorching on its surface while retaining the moisture. When the metal plate cover 7 is removed, the evaporation of the moisture was too great to result in a tough, excessively dried product even though the surface has been scorched. This shows that the degree of surface scorching and the internal heating of the material to be cooked can be controlled by adjusting the height of the insulating body 8. The presence of the insulating body 8 is effective to prevent an induction spark from occurring between the metal plate 3 and the cover 7.

EXAMPLE 2

A mixture comprising $BaO.6Fe_2O_3$ added with 2% by weight of $SiO_2$ is moulded into cylindrical form, measuring 12mm in diameter and 4mm in height, and is fired in air at a temperature of 1300°C for one hour to produce a fired semiconductor product having a specific resistance on the order of $10^2\Omega$-cm. This fired product has been used as a heating element 2, and was disposed in an annular array on a heat insulating body 5 which comprised heat insulating brick, with the periphery of adjacent fired moulds being held in contact with each other. Three circular concentric arrays having increasing number of such moulds of 9, 18 and 27 constituted together the heating element 2, which was used in the same procedure as in Example 1. The results were similar to Example 1.

EXAMPLE 3

The metal plate cover 7 in Example 1 was replaced by a metal meshwork cover having the maximum mesh size of 5mm to repeat the procedure outlined in Example 1. The results obtained were similar to those of Example 1. In this example, the material being cooked could be observed through the metal meshwork cover during the cooking process.

From the foregoing, it will be appreciated that with the microwave cooking apparatus of the invention, the heating element 2 produces heat by absorption of microwave radiation to scorch the surface of a material to be cooked concurrently with the internal heating of the material by the microwave radiation. Because the material 4 to be cooked is placed indirectly on the heating element 2 with the support 3 interposed therebetween, the cooking process takes place hygienically without causing the invasion into the material to be cooked of components contained in the heating element 2 or detergent, or without causing the oil or water contained in the material 4 such as meat or fish to be absorbed into the heating element 2.

The shield cover 7 provides a control against the overheating and drying up of the material 4 to be cooked so that as a result of the heating of the heating element 2 by absorption of the microwave radiation, combined with the internal heating characteristic to the microwave heating and cooking, a scorching can be produced on the surface of the material to be cooked while retaining a proper amount of moisture internally.

When the heating element is received within the vessel 6 with the heat insulating body 5 interposed therebetween, the external exposure of the heating element 2 which might cause mechanical damage thereto can be prevented, thereby facilitating the handling of the apparatus. The heat insulating body 5 is effective to minimize the heat loss of the heating element 2 and to prevent a spark discharge from occurring as a result of the contact of the heating element 2 with the inner wall 1 of the oven. The use of the insulating vessel 6 avoids the damage to the fragile heat insulating body 5.

The safe cooking is assured by preventing a spark discharge by means of the insulating body 8. Since the additional heating is achieved by a local heating of the heating element rather than by incorporation of an internal heater, there is no need to use a refractory and heat resisting structure for the overall inner wall of the oven. Where the heat insulating body 5 is used, the inner wall of the oven may be of similar construction as that of the conventional microwave oven in which the scorching is not performed. Since the heating of the heating element 2 occurs by utilizing a part of the microwave radiation inherently irradiated into the oven without providing any additional heater, the house wiring of the general household need not be replaced.

Having described the invention, what is claimed is:

1. An integrated cooking vessel adapted to provide controlled thermal and microwave cooking of food contained therein upon irradiation with microwave radiation, which comprises:
   a microwave-absorbing heating element having an upper surface and a lower surface, and capable of being heated rapidly to high temperatures upon irradiation with microwave radiation;
   a heat-insulating and microwave-transparent body located beneath the lower surface of said heating element for supporting said element and limiting the downward conduction of heat therefrom;
   a heat-insulating and microwave-transparent container having a lower base portion and a sidewall portion, said heat-insulating supporting body being positioned on said base portion, said heating element being supported in spaced relationship above said base portion by said supporting body, and said container sidewall portion extending upwardly from said base portion to surround said heating element and said supporting body and terminating in a container rim at the height of the upper surface of said heating element;
   flat, heat-resistant food-supporting plate means for covering said container attached to the rim portion thereof, said plate means contacting the upper surface of said heating element for enhancing the upward conduction of heat therefrom;
   an electrical insulating member positioned around said container above the rim portion thereof and extending above the level of said flat metallic food-supporting plate means; and
   a container cover, removably positioned on said electrical insulating member in spaced relationship above said metallic food-supporting plate means, said cover having selected microwave-transparent portions and selected microwave-opaque portions to permit a desired degree of microwave radiation to reach the food being cooked and to establish a desired relationship between the degree of thermal cooking and microwave cooking thereof.

2. An integrated cooking vessel as in claim 1, wherein said heat-resistant food-supporting plate means comprises a metallic plate.

3. An integrated cooking vessel adapted to provide controlled thermal and microwave cooking of food contained therein upon irradiation with microwave radiation, which comprises:
   a heat-insulating and microwave-transparent container having a base portion with an upper surface and a lower surface and a sidewall portion, the upper surface of said container base having a substantially flat portion for supporting said food to be cooked;
   a microwave-absorbing heating element, capable of being heated rapidly to high temperatures upon irradiation with microwave radiation and affixed to the lower surface of said base portion;
   means for supporting said container disposed on the lower surface of said base portion; and
   a container cover, removably positioned on said container and having selected microwave-transparent portions and selected microwave-opaque portions to permit a desired degree of microwave radiation to reach the food being cooked and to establish a desired relationship between the degree of thermal cooking and microwave cooking thereof.

* * * * *

UNITED STATES PATENT AND TRADEMARK OFFICE
CERTIFICATE OF CORRECTION

PATENT NO. : 3,941,967
DATED : March 2, 1976
INVENTOR(S) : MOMOKI SUMI ET AL.

It is certified that error appears in the above-identified patent and that said Letters Patent are hereby corrected as shown below:

Col. 10, line 21, "heat-insulating" should read --heat-resisting--

Signed and Sealed this

Twenty-third Day of November 1976

[SEAL]

Attest:

RUTH C. MASON
Attesting Officer

C. MARSHALL DANN
Commissioner of Patents and Trademarks